Dec. 15, 1925.
C. GOETZ
FOLDING STOOL
Filed Feb. 19, 1923
1,565,636
2 Sheets-Sheet 1
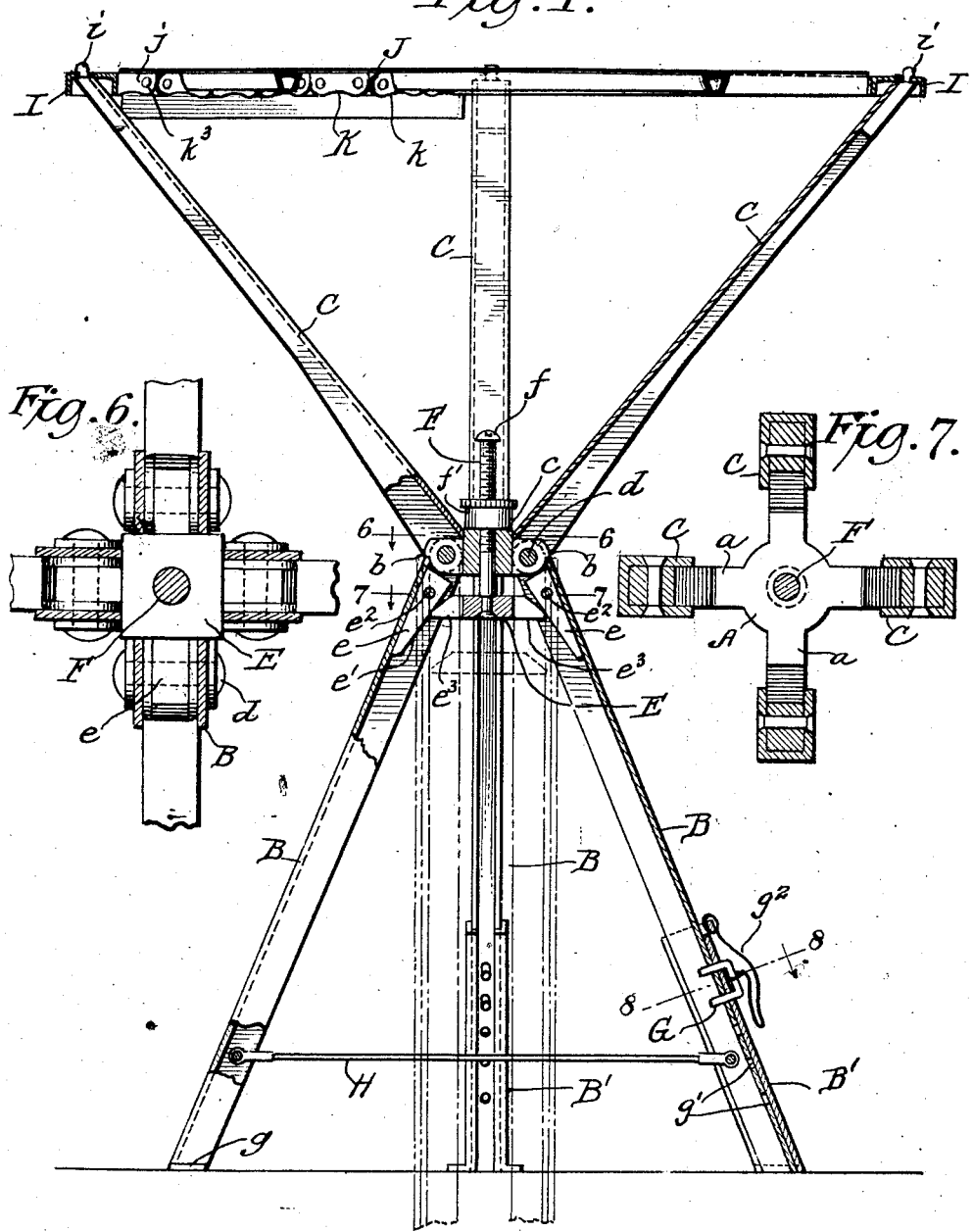
Inventor:
Charles Goetz
BY
Attorney.

Dec. 15, 1925.                                          1,565,636
C. GOETZ
FOLDING STOOL
Filed Feb. 19, 1923          2 Sheets-Sheet 2
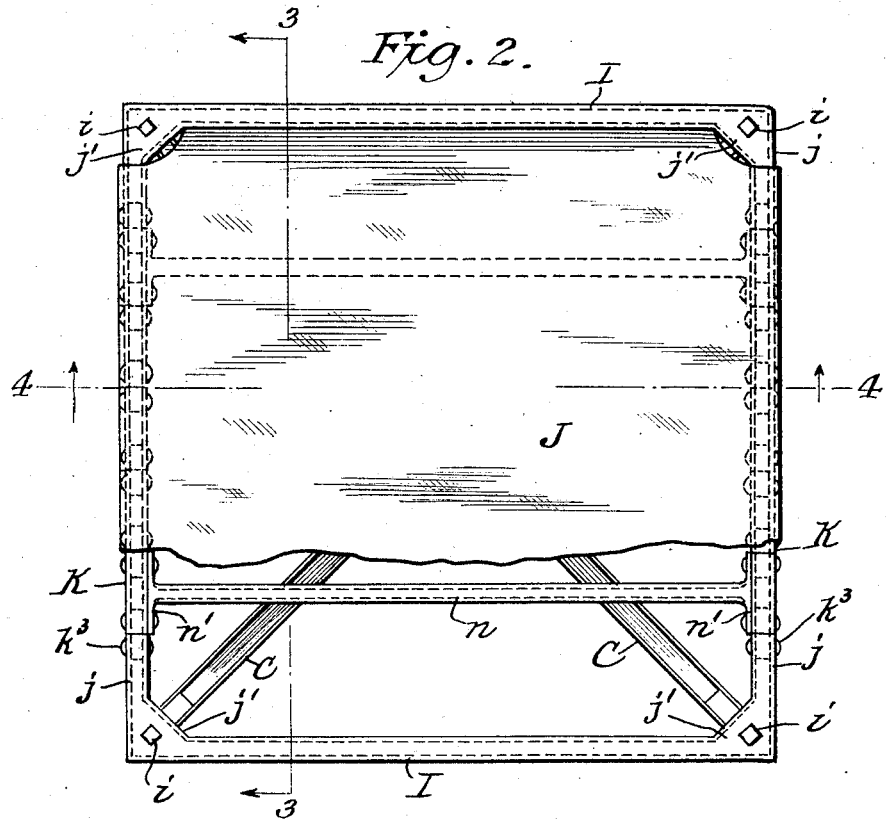
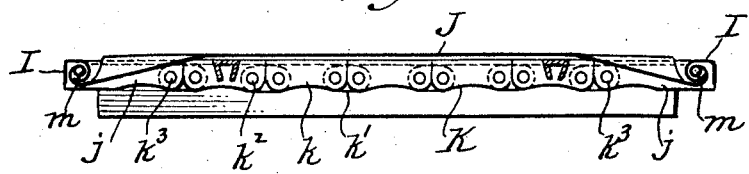
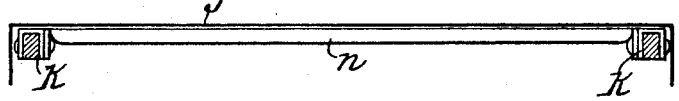
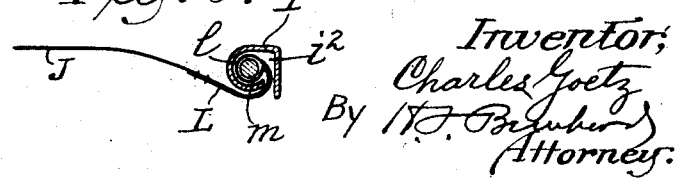

Patented Dec. 15, 1925.

1,565,636

UNITED STATES PATENT OFFICE.

CHARLES GOETZ, OF NEW YORK, N. Y.

FOLDING STOOL.

Application filed February 19, 1923. Serial No. 619,860.

*To all whom it may concern:*

Be it known that I, CHARLES GOETZ, a citizen of the United States, residing at the city of New York, borough of Manhattan, county of New York, and State of New York, have invented a certain new and useful Folding Stool, of which the following is a specification.

This invention is a folding stool, and the objects are, first to provide a simple structure the parts of which are foldable into an out of service compact relation so as to be stored within a small space and carried with ease as well as to be adapted for easy and quick unfolding to adapt the device for use; second, to retain the parts when unfolded in firm relation to each other to the end that the stool may be used with safety and to preclude accidental collapse under the weight of an occupant; third, to provide for an adjustment of the parts whereby the stool may be used on sloping ground without danger of slipping out of place and accidentally unloading the occupant by reason of use on a hillside, and, fourth, to enable the seat to be bodily dismounted from the underframing to the end that said seat and the underframing may be separately collapsed into small compact bundles.

According to the invention the stool comprises a foldable underframing and a collapsible seat member detachable at will from said underframing.

The invention consists further in an underframing embodying a connecting member, legs connected pivotally to said member, means for retaining the legs in firm relation to the member when unfolded for service, seat carrying arms connected pivotally to said member, and means for retaining said arms firmly in place in their unfolded positions, said legs and said arms being foldable into compact relation with respect to each other and to the connecting member.

The invention consists, further, of a seat member composed of flexible material, stay members positioned at the respective sides of the seat member and affording supporting means therefor against sagging under the weight of the occupant, and attaching means co-operating with the seat member and the stay members whereby the seat as an entirety may be attached to the underframing and the whole seat structure may be dismounted and rolled or collapsed into a small compass.

Other functions and advantages of the invention will appear from the following description taken in connection with the drawings, wherein—

Figure 1 is a view partly in side elevation and partly in section of a foldable stool constructed in accordance with the invention.

Figure 2 is a plan view.

Figure 3 is a detail view, in section on the line 3—3 of Figure 2, illustrating the seat member.

Figure 4 is a cross section on the line 4—4 of Figure 2.

Figure 5 is an enlarged detail section illustrating the means for securing one edge portion of the flexible seat to one of the channeled seat rails.

Figures 6, 7 and 8 are horizontal sectional views on the lines 6—6, 7—7, and 8—8, respectively, of Figure 1.

In carrying my invention into practice, I employ an underframing and a seat member, the latter being detachable from said underframing, and each member (the underframing and the seat) being of collapsible formation to the end that each may be folded within and into a compact bundle.

The underframing is shown more particularly in Figures 1, 6, 7 and 8. Said underframing is shown as comprising a connecting member A, a number of legs B, and a like number of arms C. The connecting member is provided with radial arms $a$, each recessed to produce a stop shoulder $b$, and said member has an upstanding boss $c$, see Figure 1. Through the arms $a$ pass the pins or bolts $d$, on which are loosely hung the legs B and arms C, one leg and one arm being fitted to turn on each pin or bolt $d$. Each leg B or arm C is composed of channel iron of the required dimensions, thus attaining strength with a minimum weight, and the several legs and the arms are so arranged with respect to the pivot bolts that they may be folded into compact relation. When unfolded, the edge of each leg abuts one of the shoulders $b$, and the edge of each arm strikes one face of the hub $c$, so that in the unfolded positions the legs and the arms have firm bearing against a stop which tends to limit the movement of the parts on the pivot bolts and to attain stability for the stool when unfolded and set up for use.

Means are provided for locking the legs when unfolded, and to this end each leg is provided within the channel thereof with a bearing piece $e$, shown as having an inclined face $e'$ and as being secured in place near the pivot bolt by a cross pin $e^2$. With these bearing pieces $e$ of the legs co-operates a slidable locking member E positioned below the connecting member A, said slidable locking member having fingers $e^3$ positioned for wedging engagement with the bearing pieces $e$ and operating to press the legs B outwardly so that the pivoted ends of said legs are held against the shoulders $b$. Connected loosely with the locking member is an adjusting stem F which is threaded into the connecting member A, the upper threaded part of said stem F extending above the connecting member and being provided with a suitable head $f$ and with a joint nut $f'$, whereby the stem may be rotated to impart movement to the locking member and said stem may be held in place by screwing the joint nut against the connecting member.

Two or more of the legs are provided with feet $g$, see Figure 1, but to adapt the stool to rest on sloping ground, it is preferred to construct two of the legs with extensible members, B', each extensible member being of channeled formation and fitted to the channeled legs so as to slide thereon, see Figures 1 and 8. The legs having the extensions are provided with apertures $g'$ to receive the yoke-shaped latch G, attached by a cord as $g^2$ to the leg, whereby the extension may be moved outwardly or drawn inwardly, and it may be locked in either position.

The legs are connected in pairs by the cross rods or chains H to prevent them from spreading when the stool is unfolded for service.

The arms C are provided at their upper ends with studs $i$ adapted to enter openings provided in the corner portions of the channeled seat rails I, see Figures 1 and 2. These channeled rails are provided at their ends with short arms $j$, and at the junction of these arms with the rails the metal is formed with widened corners $j'$ to accommodate the holes into which are thrust the pins or studs $i$ of said foldable arms C, thus providing a secure connection for the seat to the arms C of the underframing.

The channeled rails I I are at two sides of the seat J, the two sides of which seat are provided with flexible stays K in the form of link chains, see Figures 1 and 3. The chains are shown as comprising a series of plates $k$ and links $k'$ pivotally connected by pins $k^2$, and the end portions of each stay chain are attached by pins $k^3$ to the arms $j$ of the channeled rails I. The seat J is composed of leather, canvas, or other flexible material suitable for the purpose, said seat extending at two of its edges over the stay chains, but at its two other edges the flexible seat is shown as being provided with flaps L, each of which is formed into a loop $l$, and is encased within the channel $i^2$ of one rail I, said edge portion of the flap L being held within the channeled rail by a rod or locking member $m$ inserted within the loop $l$, see Figure 5. To limit the sagging of the flexible seat under the weight of the occupant, stay bars $n$ are provided below said flexible seat, each stay bar being attached at its ends $n'$ to corresponding members $k$ of the jointed stay chains K. Said stay chains have jointed connections at $k^3$ with the channeled rails I, two remaining margins of the seat are connected detachably by the rods $m$ to the channeled rails. The entire seat structure has a locking engagement with the underframing by the studs $i$ entering the corner portions $j'$ of the channeled rails, and thus the seat structure can be dismounted from the underframing, and the rods $m$ withdrawn from the loops $l$ and the channels of the seat rails I, whereupon the seat with the stay chains may, with the channeled rails, be rolled into a compact bundle for use in transportation.

The mode of using the stool will be readily understood from the description taken in connection with the drawings. The seat structure is unrolled and the free looped margins of the flexible seat are inserted into the channels $i^2$ of rails I, after which the rods $m$ are introduced into the loops $l$ and within the channeled rails in order to confine the two margins of the flexible seat into the desired relation of the channeled rails. The legs and the arms of the underframing are unfolded to the limits permitted by the shoulders $b$ and the hub $c$ of the connecting member, and spindle F is rotated for the fingers $e^3$ of locking member E to have firm contact with the members $e$ of the legs, thus retaining all parts of the underframing into the required firm relation. The underframing and the seat structure are assembled by placing the latter over the former in a position for the studs $i$ to enter the openings in the corners $j$ of the seat structure. The stool may be used with safety and comfort, and, if required, the extension legs B' are adjusted to adapt the stool for use on sloping ground or on a hillside. To fold the stool for convenient transportation, the seat structure is lifted off the studs $i$, the rods $m$ are withdrawn, and the seat structure rolled into a compact bundle. The locking member E is adjusted to release the members $e$, the arms are folded and the legs are also folded, thereby collapsing the underframing into a compact bundle.

Having thus fully described the invention, what I claim as new and desire to secure by Letters Patent is:

1. A folding stool embodying a foldable underframe and a collapsible seat structure, said seat structure being flexible and held in stretched demountable condition to said underframing, said underframing comprising legs and arms and an interposed member to which adjacent ends of said legs and arms are pivoted and means between said legs for distending the latter, said means including wedges on the legs adjacent said interposed member.

2. In a folding stool, a foldable underframing embodying a connecting member having legs and arms pivoted thereto, cooperating movable wedging units between said legs for holding the said legs in unfolded relation some of said units being mounted on said legs.

3. In a folding stool, a foldable underframing embodying a connecting member, legs pivoted thereto, each leg being provided with a pivoted wedge-shaped bearing member, a slidable locking member mounted on the said underframing and contacting with the bearing members, means for adjusting said locking member, and means for supporting a seat member, said last-named means being pivoted to the connecting member.

4. In a folding stool, a collapsible seat structure embodying a plurality of rails, means whereby the said rails may be detachably mounted on a supporting structure, a plurality of stay chains attached to said rails and foldable therewith, a flexible seat, and means for detachably fastening said seat to said rails and short arms at the ends of said rails to which the ends of said stay chains are attached.

5. In a folding stool, a collapsible seat structure embodying a plurality of channeled rails, a plurality of stay chains attached to said rails, a flexible seat provided with loops insertible within the channels of said rails, and locking means engageable with said loops for detachably fastening the seat to said rails.

6. In a folding top for a stool, a bodily-detachable collapsible seat structure embodying a plurality of rails provided with arms, stay chains jointedly connected to said arms of the rails, a flexible seat, and means for securing the seat to said rails.

7. In a folding top for a stool, a bodily-detachable collapsible seat structure embodying a plurality of rails provided with apertured corner portions, stay chains jointedly connected to said rails, and a flexible seat co-operable with the rails and the stay chains and stay bars disposed below the seat and at their ends jointed to said stay chains.

In testimony whereof I have hereto signed my name this 15th day of February, 1923.

CHARLES GOETZ.